United States Patent [19]

Fujisawa

[11] Patent Number: 5,158,259
[45] Date of Patent: Oct. 27, 1992

[54] VEHICULAR MANIPULATION-LEVER MOUNTING ASSEMBLY

[75] Inventor: Mutsumi Fujisawa, Okazaki, Japan

[73] Assignee: Mitsubishi Jidosha Kogyo Kabushiki Kaisha, Tokyo, Japan

[21] Appl. No.: 645,128

[22] Filed: Jan. 24, 1991

[51] Int. Cl.[5] ............................ F16M 13/00
[52] U.S. Cl. ................... 248/558; 74/473 R; 248/645
[58] Field of Search ............... 248/205.1, 558, 637, 248/678, 911, 639, 645; 74/473 R

[56] References Cited

U.S. PATENT DOCUMENTS 4,566,370 1/1986 Hanafi ................. 248/558 X

FOREIGN PATENT DOCUMENTS 871457 4/1942 France .................. 248/639

Primary Examiner—Alvin C. Chin-Shue
Attorney, Agent, or Firm—Abelman Frayne & Schwab

[57] ABSTRACT

An assembly for mounting a shift lever and a transfer lever, which has a shift-lever mounting portion provided at the center of the body of a manipulation-lever mounting device with the transfer lever selectively mountable on the right or left of the shift-lever mounting portion. The use of the present invention can assure the optimal lever arrangement in a right steering wheel vehicle or left steering wheel vehicle while using a single manipulation-lever mounting device, thus preventing the cost from increasing due to designing of a special mounting assembly otherwise required.

1 Claim, 4 Drawing Sheets

VEHICULAR MANIPULATION-LEVER MOUNTING ASSEMBLY

BACKGROUND OF THE INVENTION

1. Field of the Invention

The present invention relates to the improvement of a vehicular manipulation-lever mounting assembly on which the shift lever and transfer lever of a transmission are mounted.

2. Description of the Related Art

In general, four wheel drive vehicles capable of switching the drive state between a four wheel drive state and a two wheel drive state has a manipulation-lever mounting device body 3 on which a shift lever 1 for shifting the transmission and a transfer lever 2 for causing a transfer device to selectively set the drive state of the vehicle to the four wheel drive state or the two wheel drive state are mounted as shown in FIG. 6. In this case, for example, the engaging states of the individual gears in the transmission assembly are varied to change the drive-power transmission path from the drive shaft of the engine assembly to the output shaft side in accordance with the shifting operation of the shift lever 1, thereby selectively setting the transmission assembly to multiple stages, for example, the low, second, third, fourth or reverse position.

The transfer lever 2 is settable to, for example, the position 2H, 4H or 4L. During the normal driving, this transfer lever 2 is held at the position 2H for the two wheel drive state in which the drive power on the engine assembly is transmitted only to the output shaft on the rear wheel side to drive the rear wheels only. When the transfer lever is switched to the position 4H mainly used on rough roads, sands, or snow-covered roads, the drive state is switched to the four wheel drive state where the drive power on the engine assembly is transmitted to the output shaft on the rear wheel side, and, at the same time, the rotation of this output shaft is transmitted via a chain or the like to the drive shaft on the front wheel side, thereby simultaneously driving the front wheels as well as the rear wheels. When the transfer lever 2 is set to the position 4L used for a case requiring particularly large tractive force, the drive state is altered to the four-wheel, low-speed drive state where the drive power on the engine assembly is transferred via a decelerating mechanism to the output shaft on the rear wheel side, and, at the same time, the rotation of this output shaft is transferred via a chain or the like to the drive shaft on the front wheel side to simultaneously drive the front and rear wheels in a low-speed state.

The manipulation-lever mounting device body 3 of this type is so designed that a support 4 for the shift lever 1 is provided at approximately the center of the body 3, and a support 5 for the transfer lever 2 is disposed beside (on the right or left side of) the support 4. In the manipulation-lever mounting device body 3, a mounting portion for the shift lever 1 and a mounting portion for the transfer lever 2 are each provided on a single location. The manipulation-lever mounting device body 3 is installed at the center portion between the driver's seat and the adjoining passenger's seat in the vehicle. If the manipulation-lever mounting device body 3 has the transfer lever support 5 located on the right side of the shift lever support 4 and is installed in a so-called right steering wheel vehicle in which the steering wheel will be disposed on the right side as viewed from the rear of the vehicle, the person on the driver's seat will easily manipulate the transfer lever 2. If this manipulation-lever mounting device body is installed in a so-called left steering wheel vehicle, on the other hand, the shift lever 1 is likely to interfere with the manipulation of the transfer lever 2 by the person on the driver's seat, thus impairing the operability of the transfer lever 2. When alteration of the vehicle's drive state to the four wheel drive from the two wheel drive, for example, is executed while the vehicle is stopped, slight deterioration of the operability of the transfer lever would not practically raise any problem. When the drive state is changed during driving, however, the transfer lever 2 with low operability will hinder the operation to switch the drive state, thus presenting a problem on the safe driving.

If the manipulation-lever mounting device body 3 specially designed to have the transfer lever support 5 located on the left side of the shift lever support 4, is installed in the left steering wheel vehicle, the operability of the transfer lever 2 would be improved. In this case, however, it is necessary to provide two separate manipulation-lever mounting device bodies, the one for the right steering wheel vehicle and the other for the left steering wheel vehicle, thus inevitably increasing the manufacturing cost.

SUMMARY OF THE INVENTION

It is therefore an object of the present invention to provide a vehicular manipulation-lever mounting assembly which will not impair the operability of the transfer lever irrespective of the right steering wheel vehicle or the left steering wheel vehicle, and will reduce the cost as compared with a case of providing separate manipulation-lever mounting device bodies respectively for these two types of vehicles.

To achieve this object, there is provided a vehicular manipulation-lever mounting assembly in which a mounting portion for a shift lever is formed at a center position of a mounting device body along a vehicle's width direction, and supports for slidably supporting a shift rail operable by the transfer lever to selectively permit the shift rail to be attached to one of the supports, are provided at symmetrical positions along the vehicle's width direction with respect to the center position of the mounting device body, whereby the transfer lever is mountable to the mounting device body in accordance with the attaching position of the shift rail.

According to the present invention, when the shift rail is mounted to the shift rail support on the right side of the shift-lever mounting portion of the manipulation-lever mounting device body and the transfer lever is mounted on the right side thereof, the mounting device body can be used for right steering wheel vehicles. When the shift rail is mounted to the shift rail support on the left side of the shift-lever mounting portion of the mounting device body and the transfer lever is mounted on the left side thereof, the mounting device body can be used for left steering wheel vehicles.

The use of the present invention can assure the optimal lever arrangement in a right steering wheel vehicle or left steering wheel vehicle while using a single manipulation-lever mounting device, thus preventing the cost from increasing due to designing of a special mounting assembly otherwise required.

BRIEF DESCRIPTION OF THE DRAWINGS

FIG. 1 is a longitudinal cross section schematically showing the structure of essential portions of a manipulation-lever mounting device body to be installed in a right steering wheel vehicle, and FIG. 2 is a plan view thereof.

FIG. 3 is a longitudinal cross section taken along the line III—III in FIG. 1.

FIG. 4 is a longitudinal cross section schematically showing the structure of essential portions of a manipulation-lever mounting device body to be installed in a left steering wheel vehicle, and FIG. 5 is a plan view thereof.

DETAILED DESCRIPTION OF THE PREFERRED EMBODIMENT

A preferred embodiment of the present invention will now be described referring to the accompanying drawings.

Figure 1:
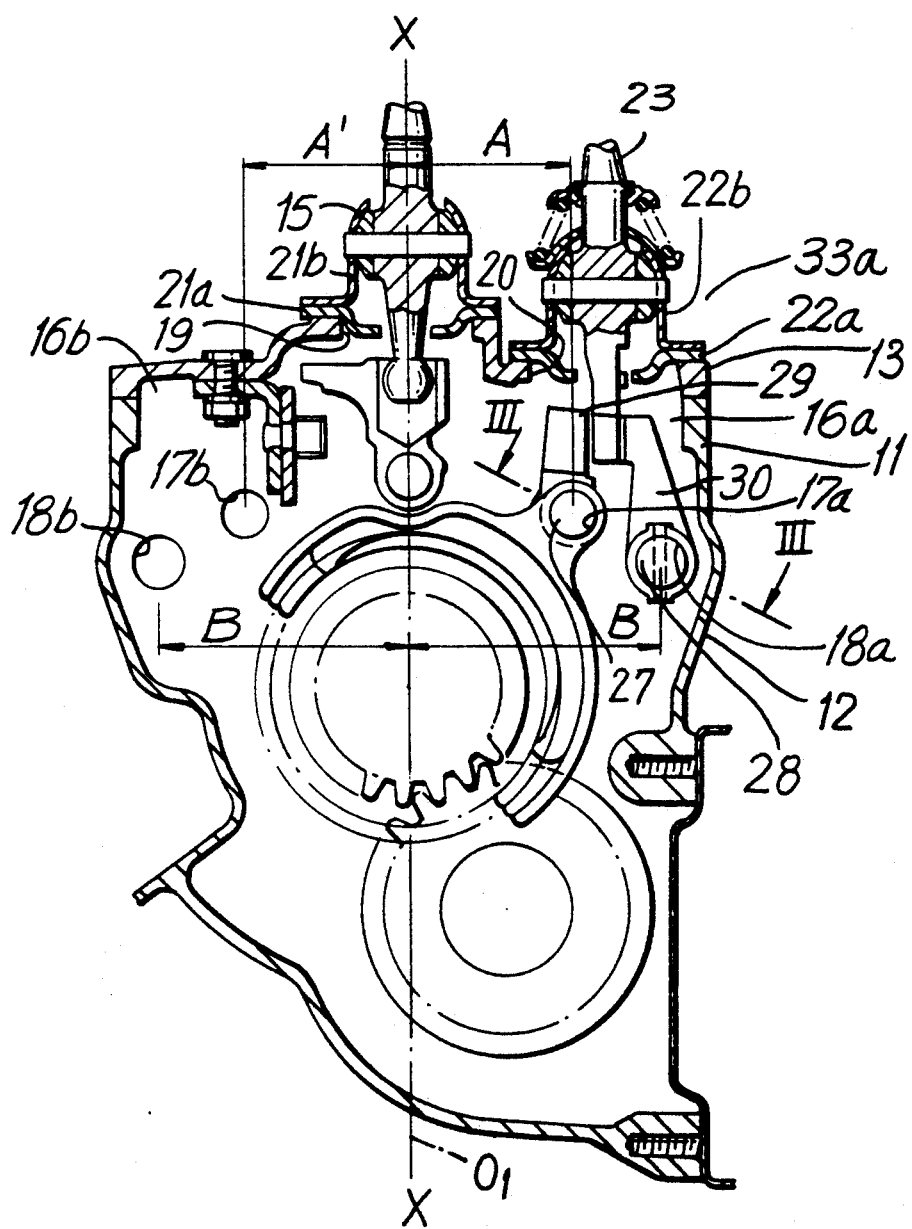
FIGS. 1 through 5 illustrate one embodiment of the present invention.

Referring to FIG. 1, reference numeral "11" denotes a manipulation-lever mounting device body on which a case 12 having an opening formed at the top and a top plate 13 serving as a lid member are provided; the top plate 13 is attached to the top opening of the case 12.

In the mounting device body 11, a mounting portion 15 for a shift lever 14 is provided at the center portion along the vehicle's width direction (horizontal direction in FIG. 1, and a pair of transfer-lever mounting portions 16a and 16b are provided at symmetrical positions with respect to the center of the mounting device body 11. In this case, the case 12 of the mounting device body 11 has H/L shift rail holes 17a and 17b and 2/4 shift rail holes 18a and 18b formed at line symmetrical positions with the X—X axis of the vehicle's width direction of the case 12 taken as the center. The distances A and A' between the X—X axis and the individual H/L shift rail holes 17a and 17b are equal to each other, and the distances B and B' between the X—X axis and the 2/4 shift rail holes 18a and 18b are equal to each other.

Figure 2:
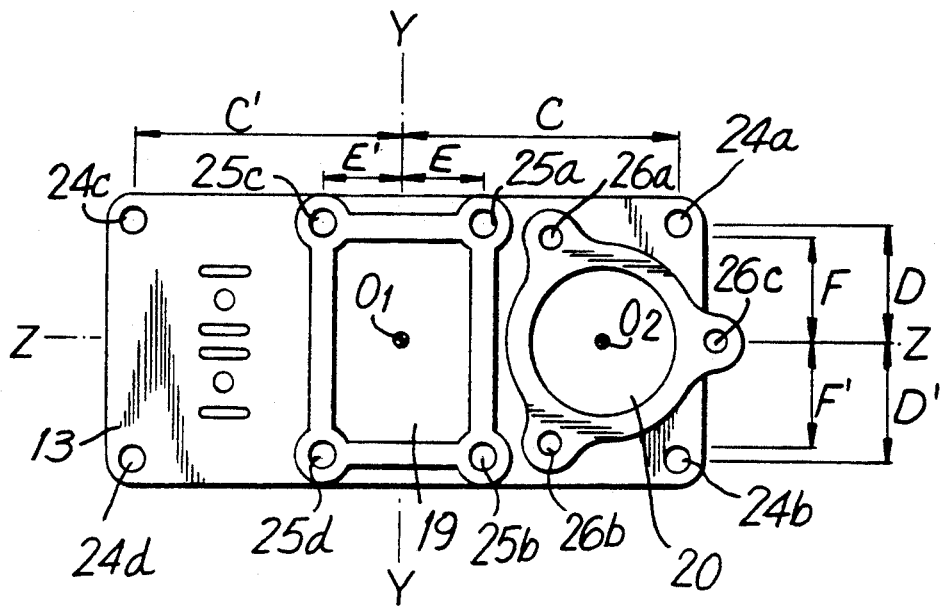

The top plate 13 of the mounting device body 11 has a shift-lever mounting hole 19 formed in an approximately rectangular shape at the center portion in such a way that both side portions of the hole 19 have the same size as shown in FIG. 2. A transfer-lever mounting hole 20 is formed on one side of the shift-lever mounting hole 19. The shift lever 14 is mounted through a stopper plate 21a and a shift-lever support bracket 21b in the mounting hole 19 of the top plate 13, while a transfer lever 23 is mounted through a stopper plate 22a and a transfer-lever support bracket 22b in the mounting hole 20. In this case, the position of the center line $O_1$ of the shift lever 14 and the position of the center line $O_2$ of the transfer lever 23 lie on the same line along the Z—Z direction (vehicle's width direction) in FIG. 2. Further, bolt mounting holes 24a, 24b, 24c and 24d are formed at the four corners of the top plate 13. These bolt mounting holes 24a to 24d are arranged at line symmetrical positions with the Y—Y line and Z—Z line being the center. In other words, the mounting holes 24b and 24c are arranged in a point symmetrical fashion with respect to the center $O_1$, so are the mounting holes 24a and 24d.

The distance C between the Y—Y line and the bolt mounting hole 24a or 24b and the distance C' between the Y—Y line and the mounting hole 24c or 24d are equal to each other, so are the distance D between the Z—Z line and the bolt mounting hole 24a or 24c and the distance D' between the Z—Z line and the bolt mounting hole 24b or 24d.

Reference numerals "25a," "25b," "25c," and "25d" indicate mounting holes for the shift-lever support bracket 21b, and reference numerals "26a," "26b" and "26c" are mounting holes for the transfer-lever support bracket 22b. In this case, the bracket mounting holes 25a, 25b, 25c and 25d are arranged at line symmetrical positions with the Y—Y line and Z—Z line being the center, and the distances E between the Y—Y line and the mounting hole 25a or 25b is equal to the distance E' between the Y—Y line and the mounting hole 25c or 25d, so is the distance D between the Z—Z line and the mounting hole 25a or 25c equal to the distance D' between the Z—Z line and the mounting hole 25b or 25d. Further, the bracket mounting holes 26a and 26b are arranged at line symmetrical positions with respect to the Z—Z line, and the distances F and F' between the Z—Z line and the mounting holes 26a and 26b are equal to each other.

Figure 3:
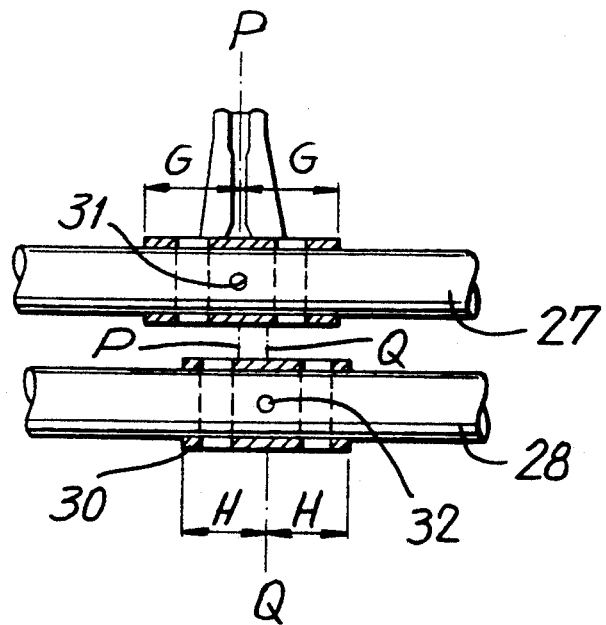

Accordingly, the top plate 13 of the mounting device body 11 can selectively be mounted to the left or right side of the case 12. In installing the mounting device body 11 in a right steering wheel vehicle, the top plate 13 is secured by means of bolts to the case 12, with the transfer lever 23 on the top plate 13 being located on the right side of the shift lever 14, as shown in FIGS. 1 and 2. In this state, an H/L shift rail 27 is fitted in the H/L shift rail hole 17a, and a 2/4 shift rail 28 is fitted in the 2/4 shift rail hole 18a. Further, an H/L shift fork 29 is attached to the H/L shift rail 27, while a 2/4 shift rag 30 is attached to the 2/4 shift rail 28. In this case, the H/L shift fork 29 and 2/4 shift rag 30 are formed in a line symmetrical shape with the P—P line and Q—Q line being the center as shown in FIG. 3; secure pins 31 and 32 are respectively provided on the P—P line and Q—Q line. In this condition, the transfer lever 23 is mounted on the transfer-lever mounting portion 16a on the right side of the mounting device body 11, thereby forming a transfer-lever support 33a.

Figure 4:
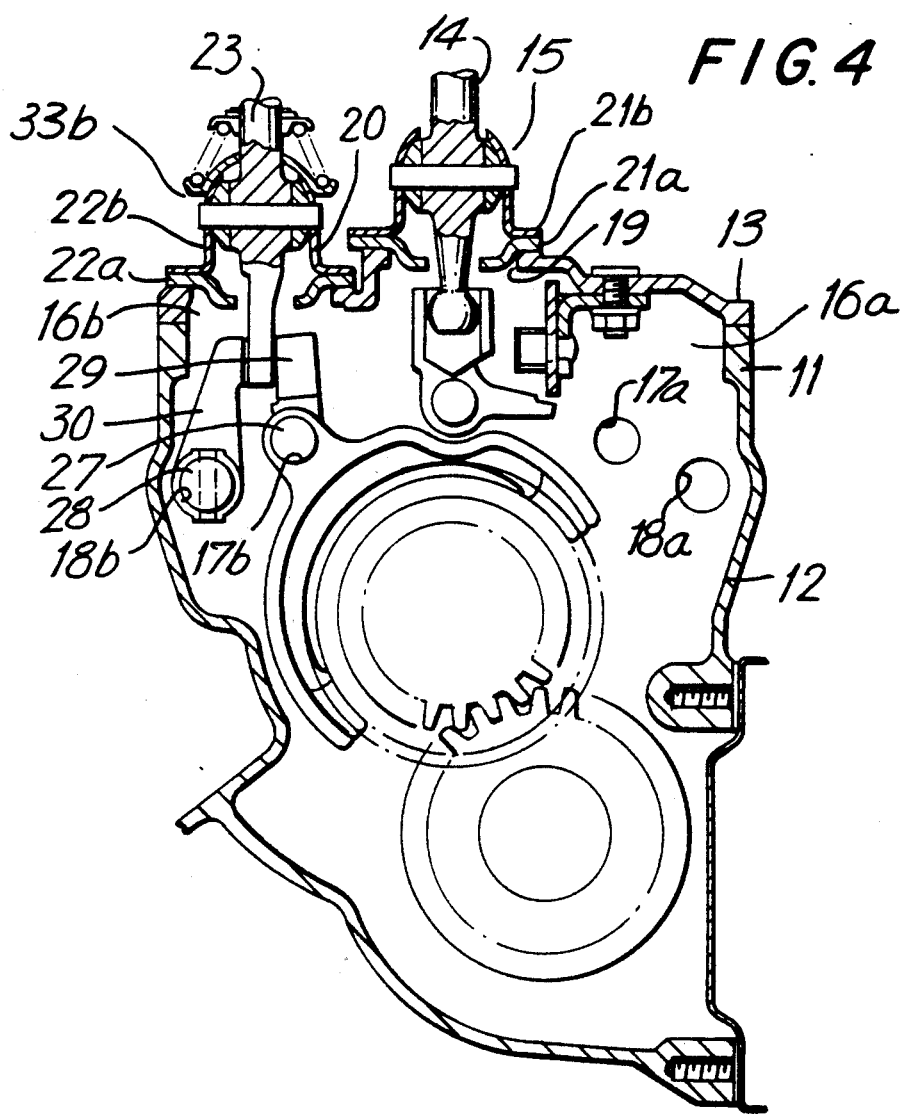
Figure 5:
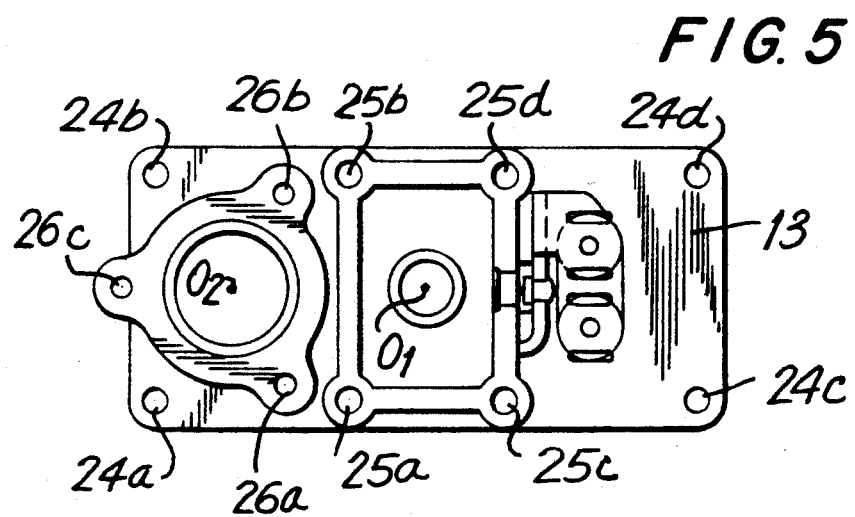
Figure 6:
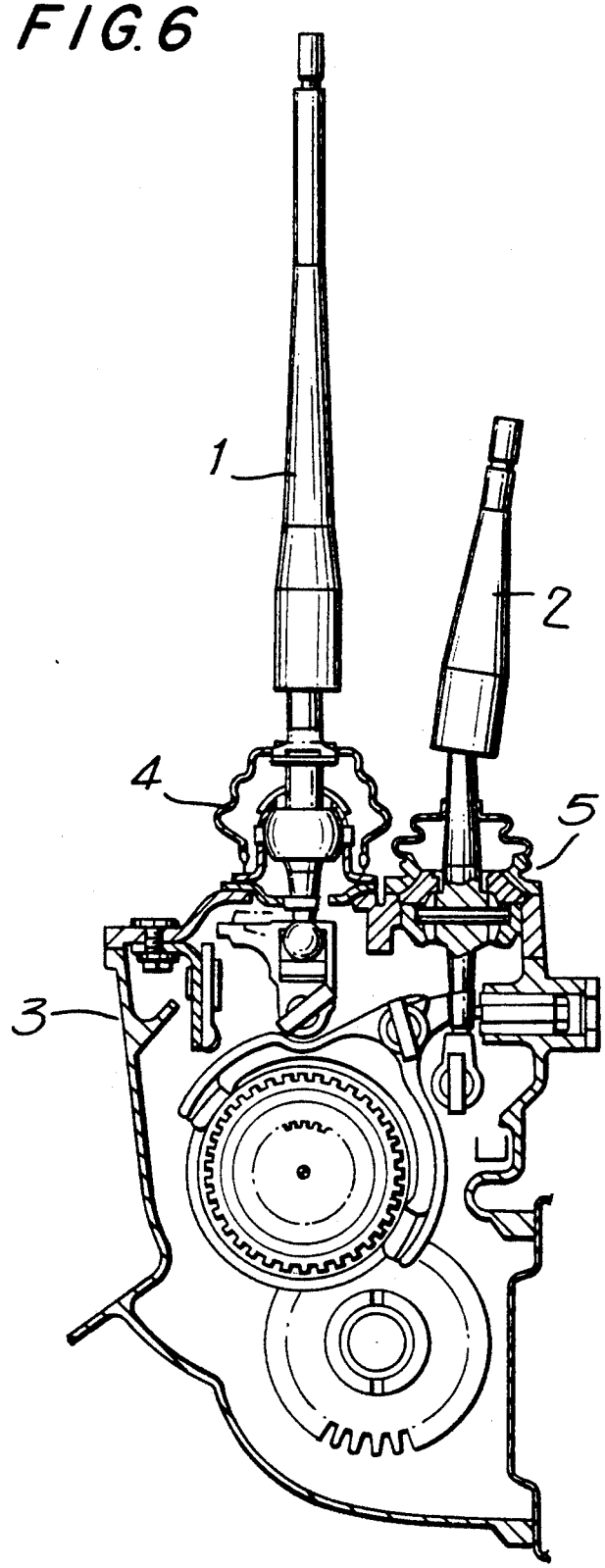
FIG. 6 is a longitudinal cross section schematically illustrating the structure of the essential portions of a conventional manipulation-lever mounting device body.

In installing the mounting device body 11 in a left steering wheel vehicle, the top plate 13 is secured by means of bolts to the case 12, with the transfer lever 23 on the top plate 13 being located on the left side of the shift lever 14, as shown in FIGS. 4 and 5. In this state, the H/L shift rail 27 is fitted in the H/L shift rail hole 17b, and the 2/4 shift rail 28 is fitted in the 2/4 shift rail hole 18b. In this condition, the transfer lever 23 is mounted on the transfer-lever mounting portion 16b on the left side of the mounting device body 11, thereby forming a transfer-lever support 33b.

With the above structure, the shift-lever mounting portion 15 is placed at the center of the mounting device body 11, while a pair of the transfer-lever mounting portions 16a and 16b are arranged symmetrically with respect to the center of the mounting device body 11 so that the transfer lever 23 can be selectively and properly mounted on the mounting portion 16a or 16b. Further, the transfer lever 23 is selectively mounted on either the transfer-lever mounting portion 16a or 16b so as to form the transfer-lever support 33a or 33b accordingly. The transfer lever 23 can therefore be mounted on the transfer-lever mounting portion 16a positioned on the right side of the shift-lever mounting portion 15 of the mounting device body 11 to form the transfer lever support 33a, thereby permitting the mounting device body 11 to be installed in a right steering wheel vehicle. Moreover, the transfer lever 23 can be mounted on the transfer lever mounting portion 16b on the left side of the shift-lever mounting portion 15 of the mounting device body 11 so as to form the transfer-lever support 33b, thus permitting the mounting device body 11 to be installed in a left steering wheel vehicle. The shift lever 14 and the transfer lever 23 can be arranged at the proper positions in the mounting device body 11 for the use in the right steering wheel and the left steering wheel vehicle. This design, unlike the prior art, can prevent the mounting device body 11 particularly designed for a right steering wheel vehicle from being used in a left steering wheel vehicle. Therefore, as the shift lever 14 does not interfere with a driver manipulating the transfer lever 23, the operability of the transfer lever 2 can be improved. Also, even when the drive state is selected during driving, the switching of the transfer lever 2 can be safely done. Further, since the mounting device body 11 can be used commonly for the right steering wheel as well as the left steering wheel vehicle, the cost reduction is assured, compared with the case where the mounting device body specially designed for a left steering wheel vehicle and the mounting device body specially designed for a right steering wheel vehicle are separately.

The present invention is not limited to the above-described embodiment, but may be modified in various manners without departing from the scope of this invention.

What is claimed is:

1. A vehicular manipulation-lever mounting assembly in which a shift lever for shifting a transmission and a transfer lever for changing a transfer device to alter a vehicle's drive state between a four wheel drive state and a two wheel drive state are mounted on a body of a mounting device, said body of said mounting device comprising:

a casing having an opening portion provided at an upper side of said casing and a shift rail provided at an inner side of said casing, said shift rail operable by said shift lever, and a cover member for covering said opening portion, said casing comprising supports, provided at symmetrical positions along said vehicle's width direction with respect to a center position of said mounting device body, for slidably supporting said shift rail and at least one bolthole, said cover member comprising a mounting portion for said shift lever provided at a position corresponding to a center position of said mounting device body, a mounting portion for said transfer lever being provided at a position corresponding to one of said supports and at least one bolthole, wherein said boltholes are symmetrically arranged with respect to said center position of said mounting device for fixing said casing and said cover member.

* * * * *